June 15, 1926.

W. N. BOOTH

VEHICLE WHEEL

Filed Nov. 24, 1919   2 Sheets-Sheet 1

1,588,934

Inventor
William N. Booth

By Whittemore, Hulbert & Whittemore
Attorneys

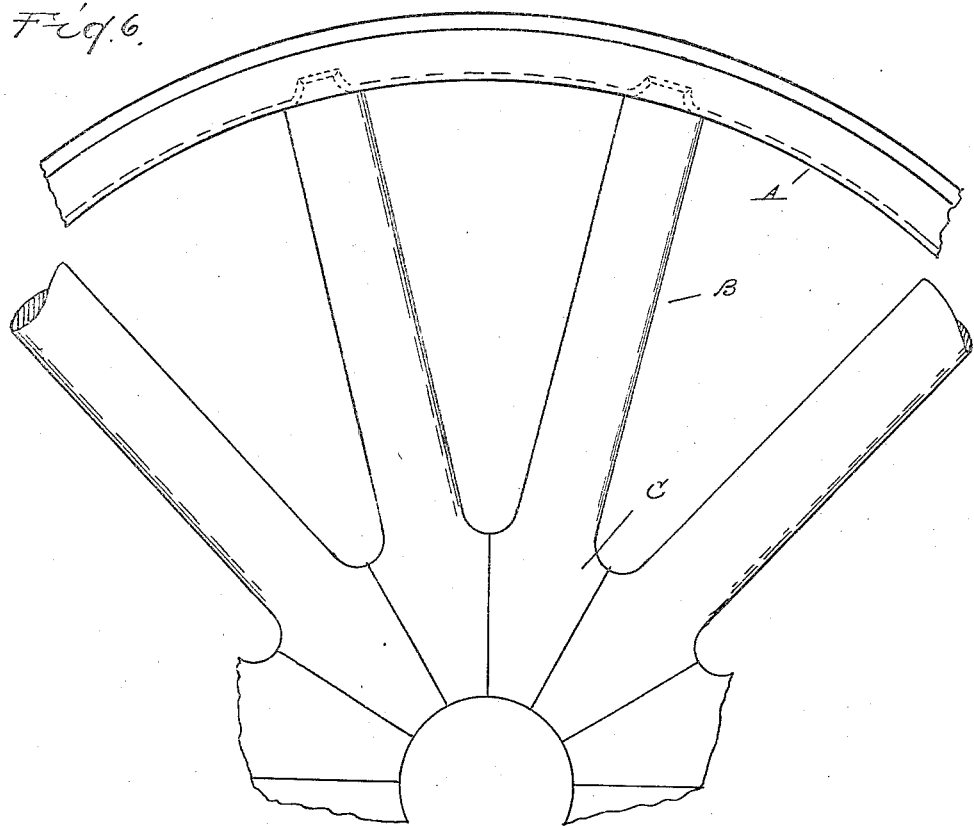
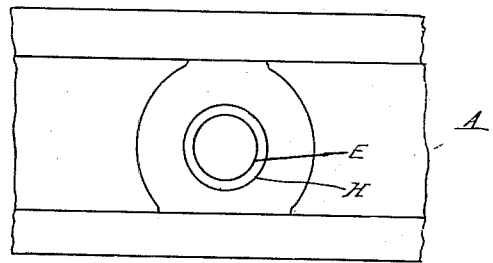
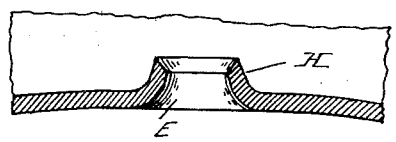

Patented June 15, 1926.

1,588,934

UNITED STATES PATENT OFFICE.

WILLIAM N. BOOTH, OF DETROIT, MICHIGAN.

VEHICLE WHEEL.

Application filed November 24, 1919. Serial No. 340,267.

The invention relates to vehicle wheels of that type comprising a metallic fixed rim and wooden spokes, and has more particular reference to the means employed for forming a tight joint between the spokes and fixed rim. Heretofore, wheels have been constructed in which the outer ends of the spokes are provided with tenons engaging apertured bearings in the metallic fixed rim. When the wheel is assembled, a radially outward pressure is exerted on the spokes, which is intended to force the shoulder adjacent to the tenon into firm engagement with the fixed rim. It has been found, however, that in spite of this outward pressure, the shoulder is seldom in full engagement with the metal, with the result that after use the joint may loosen. The reason for this defect is that in forming the tenons upon the ends of the spokes, the shoulder is in a plane substantially perpendicular to the axis of the spoke, whereas in the forming of the fixed rims the bearing for the spoke shoulder is a segment of a circle. This will leave a slight gap between the shoulder on the wood and the metal in the central transverse plane of the spoke, and the strongest pressure that can be practically applied to the spoke is insufficient to completely close this gap.

It is the object of the present invention to overcome this defect, which I have accomplished by a re-fashioning of the fixed rim comprising the embossing thereof to conform to the shoulder of the spoke, as hereinafter set forth.

In the drawings:

Figures 4 and 5 are respectively a plan view and a longitudinal section through the seat portion of the fixed rim drawn to normal size;

Figure 6 is an elevation of the wheel.

Figure 3:
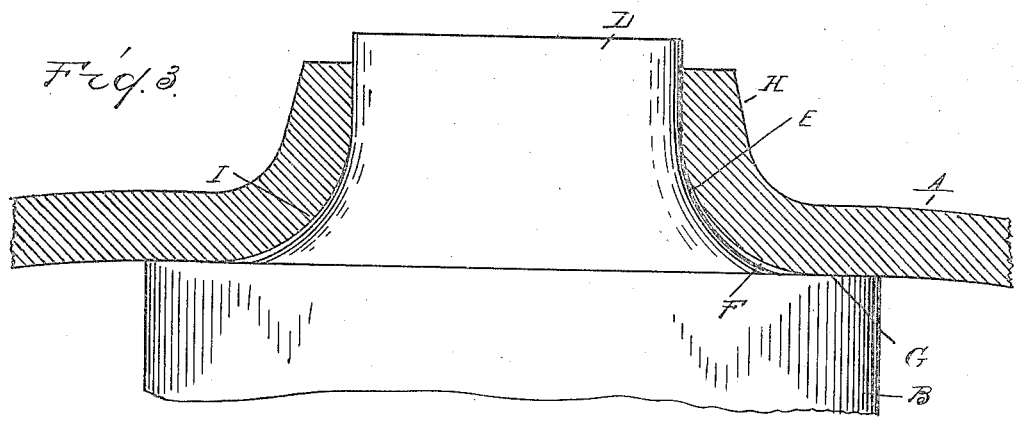
Figure 3 is a similar view showing the spoke in engagement with its seat.
Figure 1:
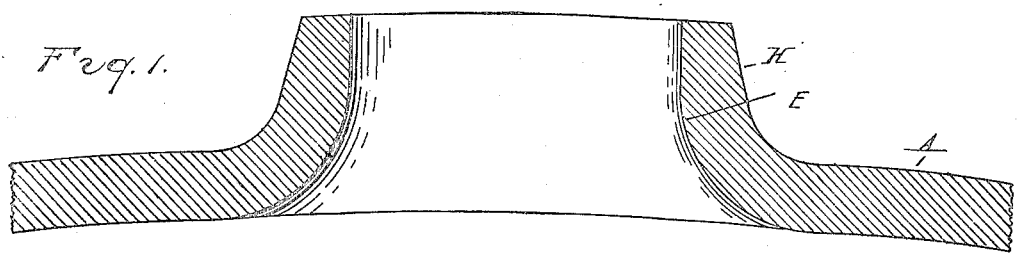
Figure 1 is an enlarged section through a segment of the wheel fixed rim before the refashioning of the same.
Figure 2:
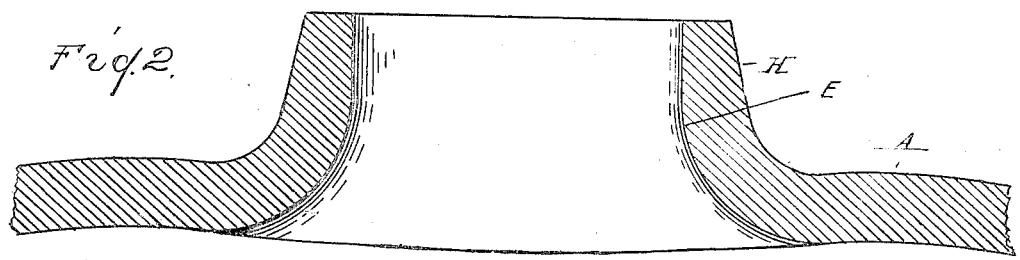
Figure 2 is a similar view after refashioning.

A is the channel-shaped metallic fixed rim of the wheel; B are the wooden spokes, which at their inner ends are provided with wedge-shaped portions C for engaging each other and at the outer ends with the tenons D for engaging apertured bearings E in the fixed rim. To impart strength to the spoke, the base of each tenon is formed with a fillet F rounding into the annular shoulder G, which abuts against the fixed rim and the fixed rim is also preferably formed with the flanges H surrounding the apertured bearings E and extending outward to form a cylindrical portion for fitting the tenon.

In the practical manufacture of wheels, it is usual to first form annular fixed rims and then to punch the web portion of each fixed rim to form the apertured seats E and the outwardly extending flanges H. This method of construction is not altogether satisfactory, for in the punching of the fixed rims the metal of the flanges H is left in a more or less ragged condition, due to tearing in expanding its diameter. Also, as has been previously stated, the inner face of the fixed rim is of concave segmental form and therefore will not form a tight joint with the square shoulder G on the spoke. Still another difficulty is that the fillets at the base of the tenons sometimes bear against the rounded portion of the seat E, thereby holding the shoulder G away from the web of the fixed rim.

To form my improved construction the fixed rim is first punched to form the apertures of the tenons, but is not completely fashioned during this operation. Subsequently, the fixed rim is refashioned in dies, which first impart an exact form to the rounded portion I, making it of a radius slightly greater than that of the fillet on the spoke at this point when the spokes are engaged. The refashioning operation also changes the shape of the web portion of the fixed rim by embossing the web portion to flatten the same in the portion bearing against the shoulder G of the spoke, or preferably to impart thereto a slightly reverse curve which will first find its bearing upon the shoulder G in the central transverse plane of the spoke. With this construction, when the spoke is forced into the fixed rim, the reverse curve will be completely flattened, resulting in a bearing for the shoulder G which is in contact therewith all the way around the spoke. The tenon of the spoke will also tightly fit the flange H, but there will be a slight clearance between the rounded portion I and the fillet F, so as to avoid possibility of holding the shoulder G out of contact.

A wheel constructed as described will be very much stronger than one in which the fixed rim remains in its segmental form and after extensive use the spokes will still be in tight engagement with the fixed rim.

What I claim as my invention is:

1. In a vehicle wheel having a spoke with a tenon on the outer end thereof surrounded by a shoulder in a plane perpendicular to the longitudinal axis of the spoke, a metallic fixed rim apertured for engagement with the tenon and having a radially inwardly embossed portion surrounding the aperture and bent inward into a slight reverse curve whereby the pressure of the spoke will force the shoulder thereof into full contact with the embossed portion.

2. In a vehicle wheel having a spoke with a tenon at the outer end thereof and a fillet at the base of the tenon merging into an annular shoulder surrounding the tenon and located in a plane perpendicular to the longitudinal axis of the spoke, a metallic fixed rim apertured for engagement with the tenon and provided with an outwardly extending annular flange for fitting the tenon and with an embossed portion for contacting with the annular shoulder on all sides of the tenon, said annular flange having a rounded portion merging into the embossed portion of a slightly different curvature from the fillet of the tenon to provide clearance at this point when the spoke is pressed into the fixed rim.

3. In a vehicle wheel having a spoke provided with aligned portions, the outer portion being reduced to form a tenon and the adjacent portion presenting at its outer end a shoulder symmetrically arranged with respect to the longitudinal axis of the spoke, a metallic fixed rim apertured for engagement with the tenon portion of said spoke and having an embossed portion surrounding the aperture and bent inward slightly beyond its final spoke engaging position, whereby the pressure of the spoke will force the shoulder into full contact with the embossed portion.

4. In a spoked vehicle wheel, a metallic fixed rim having an embossed portion for engagement with the outer end of a spoke, said embossed portion being bent inward into a slight reverse curve whereby the pressure of the spoke will force the shoulder thereof into full contact with the embossed portion.

5. In a wheel, the combination of tenoned spokes each having an annular shoulder surrounding the tenon symmetrically arranged with respect to the longitudinal axis of the spoke, an annular metallic fixed rim having tenon receiving portions and embossed portions adjacent to the tenon receiving portions and depressed toward the axis of the wheel, each embossed portion having a surface conformed by the radial outward pressure of the spoke into contact bearing over an extended area with the annular shoulder thereof.

6. In a wheel, the combination of a plurality of wooden spokes, each having a shouldered portion at its outer end and a tenon projecting from the shouldered portion, said shouldered portion having a face of relatively large area and having a contour other than an arc whose center is the axis of the wheel and an annular metallic fixed rim of channel shape provided with a base having ferrules for receiving the spoke tenons extending within the channel and having the portion of the base of the felly adjacent the ferrules embossed radially inward toward the axis of the wheel to form an extended bearing surface for the spoke shoulder.

7. In a wheel having wooden tenoned spokes each with an annular shoulder surrounding the tenon symmetrically arranged with respect to the longitudinal axis of the spoke, an annular metallic fixed rim formed of slightly resilient material and having annular flanged portions extending away from the axis of the wheel for receiving the spoke tenons and embossed portions surrounding the annular flanged portions and extending toward the axis of the wheel, each embossed portion presenting a face disposed beyond its respective annular flanged portion on all sides thereof and symmetrically arranged with respect to the axis of the annular flanged portion for continuous contact over an extended area with the spoke shoulder and having a tight fit therewith, said embossed portions and annular flanged portions cooperating to form trusses.

In testimony whereof I affix my signature.

WILLIAM N. BOOTH.